US012539843B2

(12) United States Patent
Sosa et al.

(10) Patent No.: US 12,539,843 B2
(45) Date of Patent: Feb. 3, 2026

(54) AUTOMATIC VALET PARKING FOR VEHICLE

(71) Applicant: FORD GLOBAL TECHNOLOGIES, LLC, Dearborn, MI (US)

(72) Inventors: Arian Sosa, Morelia (MX); Yulianna Torres, Northville, MI (US); Ryan Craig, Ann Arbor, MI (US); Salvador Toledo, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 18/125,502

(22) Filed: Mar. 23, 2023

(65) Prior Publication Data

US 2024/0317213 A1 Sep. 26, 2024

(51) Int. Cl.

| | |
|---|---|
| ***B60W 30/06*** | (2006.01) |
| ***B60R 25/24*** | (2013.01) |
| ***B60W 40/08*** | (2012.01) |
| ***G06V 40/16*** | (2022.01) |

(52) U.S. Cl.

CPC ............. *B60W 30/06* (2013.01); *B60R 25/24* (2013.01); *B60W 40/08* (2013.01); *G06V 40/16* (2022.01); *B60W 2420/403* (2013.01); *B60W 2540/043* (2020.02); *B60W 2556/45* (2020.02)

(58) Field of Classification Search

CPC ....... B60W 30/06; B60W 40/08; B60R 25/24; B60R 25/04

See application file for complete search history.

(56) References Cited

U.S. PATENT DOCUMENTS

| | | | |
|---|---|---|---|
| 8,700,255 B2 | 4/2014 | Joseph | |
| 9,043,080 B2 | 5/2015 | Bock et al. | |
| 9,377,315 B2 | 6/2016 | Grover et al. | |
| 9,452,735 B2 | 9/2016 | Miller et al. | |
| 9,811,801 B2 | 11/2017 | Gulli et al. | |
| 10,106,172 B2 | 10/2018 | Wingfield et al. | |
| 12,175,415 B2 * | 12/2024 | Javidan | G06Q 10/08355 |
| 2010/0332363 A1 | 12/2010 | Duddle et al. | |
| 2016/0116293 A1 * | 4/2016 | Grover | G08G 1/005 701/23 |
| 2021/0105619 A1 * | 4/2021 | Kashani | G10L 15/25 |
| 2023/0161583 A1 * | 5/2023 | Fang | B60R 16/023 701/36 |

FOREIGN PATENT DOCUMENTS

| | | |
|---|---|---|
| CN | 112863218 A | 5/2021 |
| WO | 2022218641 A1 | 10/2022 |

OTHER PUBLICATIONS

Tesla Model S Owner's Manual, 2021 +, Software version: 2023.6, North America, Feb. 28, 2023, 276 pages.

* cited by examiner

*Primary Examiner* — Scott A Browne
*Assistant Examiner* — Josephine Elizabeth Rich
(74) *Attorney, Agent, or Firm* — Joseph Zane; Brooks Kushman P.C.

(57) ABSTRACT

A vehicle includes a controller programmed to, responsive to receiving information for an appointment. The controller is further programmed to schedule a valet event using the information in anticipation for a valet mode associated with the appointment. The valet event includes one or more conditions. The controller is further programmed to responsive the one or more conditions being met, activate the valet mode to restrict at least one vehicle function without requiring a user authentication.

16 Claims, 3 Drawing Sheets

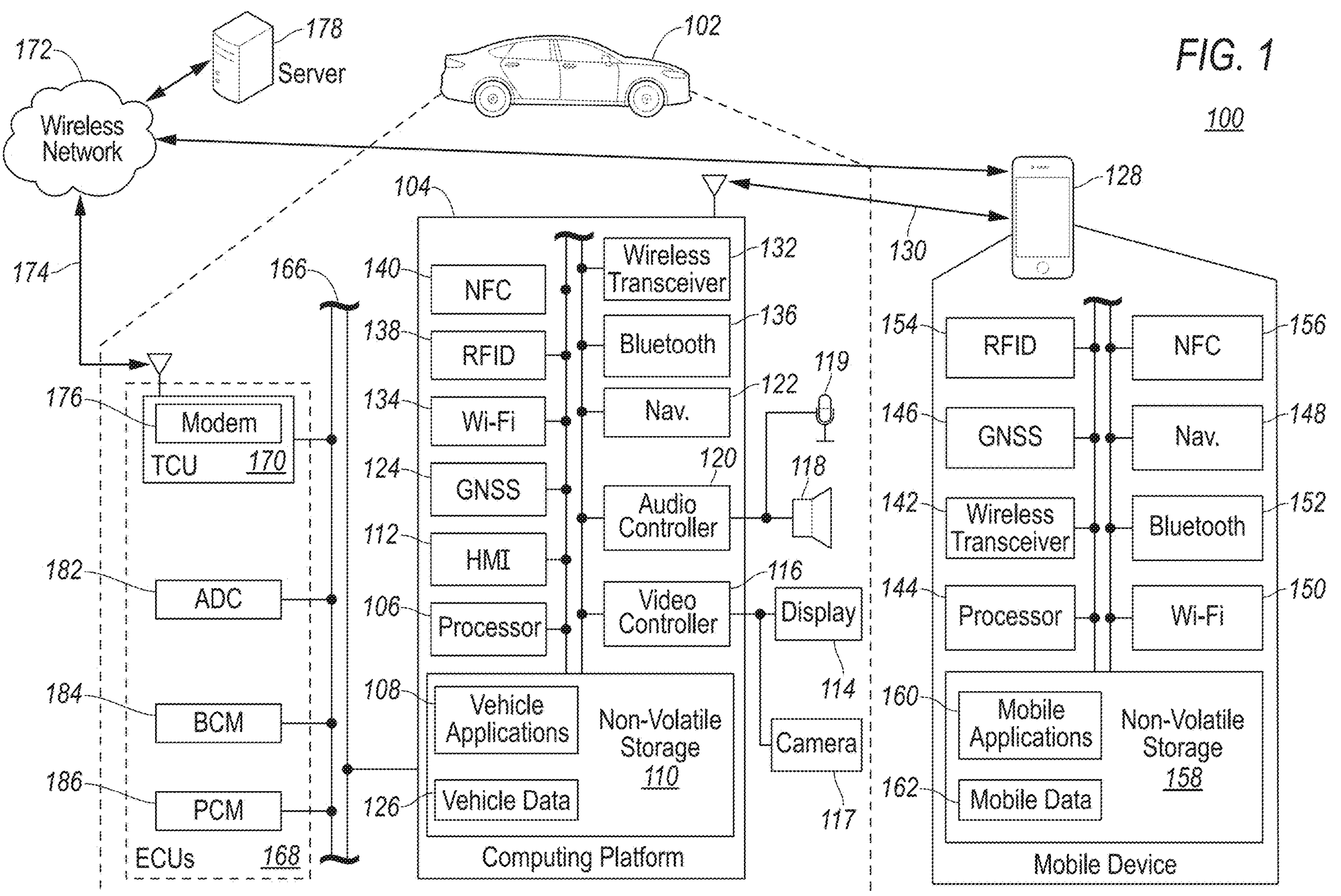
FIG. 1
100
172
Wireless Network
178
Server
102
174
104
128
130
166
140
NFC
Wireless Transceiver
132
138
RFID
Bluetooth
136
134
Wi-Fi
Nav.
122
119
124
GNSS
Audio Controller
120
118
112
HMI
116
106
Processor
Video Controller
Display
114
108
Vehicle Applications
Non-Volatile Storage 110
Camera
117
126
Vehicle Data
Computing Platform
176
Modem
TCU 170
182
ADC
184
BCM
186
PCM
ECUs 168
154
RFID
NFC
156
146
GNSS
Nav.
148
142
Wireless Transceiver
Bluetooth
152
144
Processor
Wi-Fi
150
160
Mobile Applications
Non-Volatile Storage 158
162
Mobile Data
Mobile Device

AUTOMATIC VALET PARKING FOR VEHICLE

TECHNICAL FIELD

The present disclosure generally relates to a system and method for operating vehicle features. More specifically, the present disclosure relates to a vehicle system for automatically activating a valet parking mode.

BACKGROUND

Some vehicles are provided with a special mode (e.g. valet mode or valet parking mode) when the vehicle owner asks someone else to drive the vehicle. Once activated, the valet mode may disable certain predefined vehicle features such as the infotainment system. In addition, the valet mode may limit operations of the vehicle such as imposing a speed limit. The valet mode may be activated by a manual input.

SUMMARY

In one or more illustrative embodiments of the present disclosure, a vehicle includes a controller programmed to, responsive to receiving information for an appointment, schedule a valet event using the information in anticipation for a valet mode associated with the appointment, wherein the valet event includes one or more conditions, and responsive the one or more conditions being met, activate the valet mode to restrict at least one vehicle function without requiring a user authentication.

In one or more illustrative embodiments of the present disclosure, a method for a vehicle includes responsive to receiving information for an appointment including an appointment time and appointment location, matching the appointment with one of a plurality of preset valet configurations to identify a matching configuration; schedule a valet event using the matching configuration, wherein the valet event includes one or more conditions that when met cause the vehicle to automatically transition into a valet mode in which at least one vehicle function is restricted; and responsive the one or more conditions being met, automatically activate the valet mode.

In one or more illustrative embodiments of the present disclosure, a non-transitory computer-readable medium includes instructions, when executed by a vehicle, make the vehicle to responsive to receiving information for an appointment, schedule a special vehicle mode event using the information in anticipation for a special vehicle mode associated with the appointment, wherein the special vehicle mode event is associated with one or more conditions including a location condition, and responsive the location condition being met, automatically activate the special vehicle mode to restrict at least one vehicle function without requiring a user authentication.

BRIEF DESCRIPTION OF THE DRAWINGS

For a better understanding of the invention and to show how it may be performed, embodiments thereof will now be described, by way of non-limiting example only, with reference to the accompanying drawings, in which:

FIG. 1 illustrates an example block topology of a vehicle system of one embodiment of the present disclosure.

DETAILED DESCRIPTION

Figure 2:
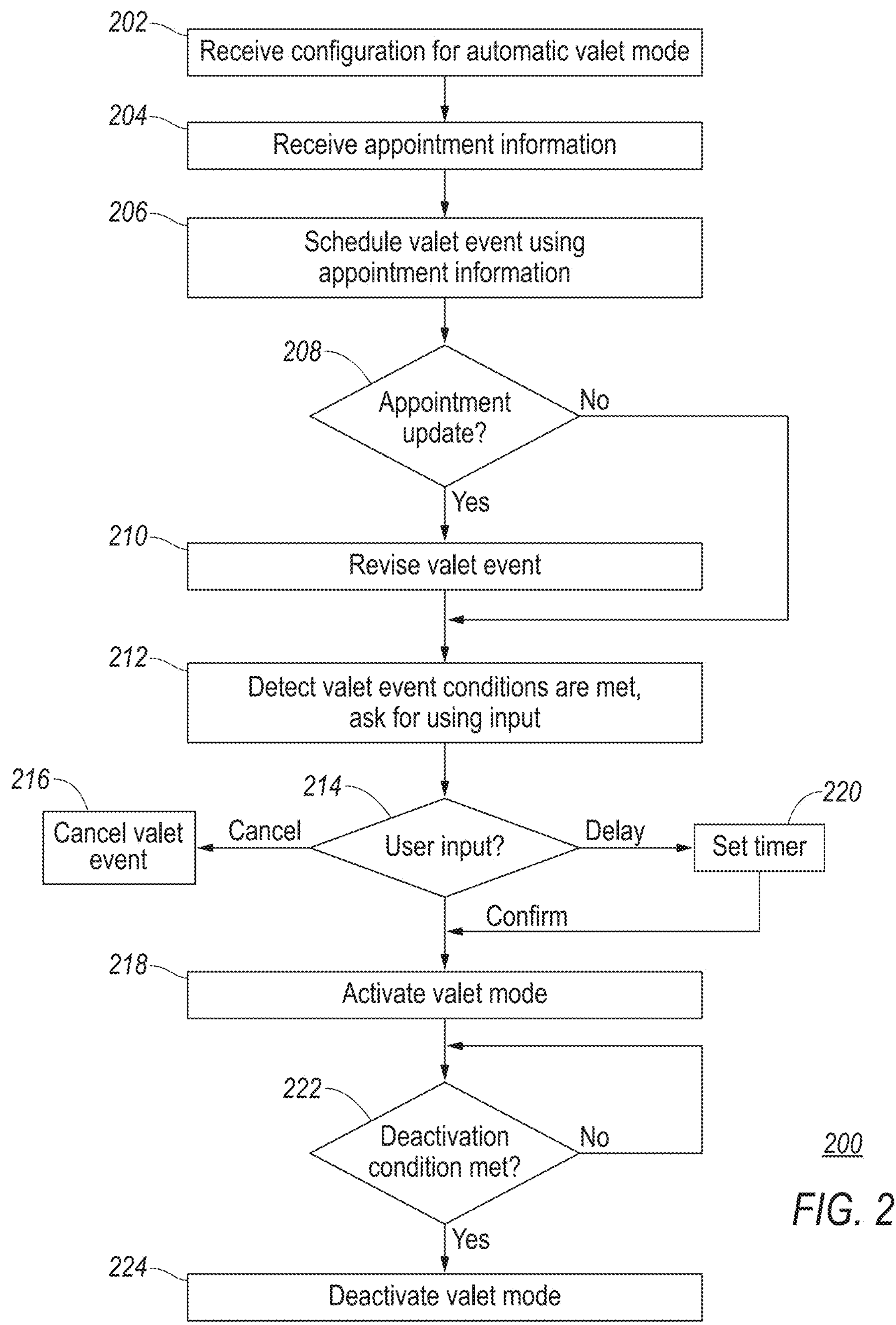
FIG. 2 illustrates an example flow diagram of a process for operating the vehicle of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, discloses a system for activating a vehicle feature. More specifically, the present disclosure discloses a system for automatically and seamlessly activating a vehicle valet mode.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), a parallel/series hybrid vehicle (PSHEV), or a fuel-cell electric vehicle (FCEV), a boat, a plane or other mobile machine for transporting people or goods. It should be noted that the illustrated system 100 is merely an example, and more, fewer, and/or differently located elements may be used.

Also illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, valet mode, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle occupants/users to interface with the computing platform 104. For example, the computing platform 104 may receive input from human machine interface (HMI) controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more cameras 117 configured to capture video images by way of the video controller 116. The cameras 117 may include one or more camera lenses located within a vehicle cabin (e.g. a dashcam) configured to capture images inside and/or outside the vehicle cabin. Additionally or alternatively, the cameras 117 may include one or more camera lenses located outside the vehicle cabin (e.g. a reverse camera or parking camera). Additionally or alternatively, the cameras 117 may include a surrounding view camera enabled by a plurality of lenses located at different sections of the vehicle to provide a 360-degree view around the vehicle 102. The computing platform 104 may also drive or otherwise communicate with one or more speakers 118 configured to provide audio output and input to vehicle occupants by way of an audio controller 120. The computing platform 104 may also drive or otherwise communicate with one or more microphones 119 configured to receive audio input from vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a GNSS controller 146 and a navigation controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, or the like.

The computing platform 104 may be configured to communicate with various electronic control units (ECUs) 168 of the vehicle 102 configured to perform various operations. For instance, the computing platform 104 may be configured to communicate with a telematics control unit (TCU) 170 configured to control telecommunication between vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities. The ECUs 168 may further include an autonomous driving controller (ADC) 182 configured to control autonomous driving features of the vehicle 102. Driving instructions may be received remotely from the server 178. The ADC 182 may be configured to perform the autonomous driving features using the driving instructions combined with navigation instructions from the navigation controller 122.

The ECUs 168 may further include a body control module (BCM) 184 configured to control various body operations of the vehicle. For instance, the BCM 184 may be configured to lock/unlock vehicle doors, trunk, glove box or the like. The ECUs 168 may further include a powertrain control module (PCM) 186 configured to control various operations of the vehicle powertrain. For instance, the PCM 186 may be configured to impose a speed limit to the vehicle powertrain. In the case that the vehicle 102 is provided with different driving modes (e.g. sport mode, economic mode), the PCM 186 may be further configured to switch between the driving mode based on user input.

As discussed above, the vehicle 102 may be provided with a valet mode feature while being operated by a valet driver. One or more vehicle features may be disabled during the valet mode to privacy and security reasons. For instance, the computing platform 104 may disable and/or restrict the functions of the vehicle infotainment system to prevent an inadvertent disclosure of private information the vehicle user (e.g. addresses). Additionally or alternatively, the vehicle 102 may further lock storage spaces (e.g. glovebox, trunk) via the BCM 184 during the valet mode. Additionally or alternatively, the vehicle 102 may impose a speed limit during the valet mode via the PCM 186. The valet mode may be manually activated and deactivated by the vehicle user. For instance, responsive to receiving a user input and authentication (e.g. a personal identification number (PIN)) via the HMI controls 112, the vehicle 102 may activate or deactivate the valet mode. Alternatively, the present disclosure proposes a system and method for automatically activating and deactivating the valet mode without requiring the user to make a manual input to the vehicle at the valet parking scene. In one embodiment, the mobile device 128 may be used as a key for authentications.

Referring to FIG. 2, an example flow diagram of a process 200 for automatically setting up and enabling a vehicle valet mode is illustrated. The process 200 may be implemented via various entities of the vehicle system 100. For simplicity the following description will be made with reference to the computing platform 104 of the vehicle 102.

At operation 202, the computing platform 104 receives one or more user configurations for the automatic valet mode. The user configuration may specify parameters associated with the automatic valet mode. These parameters may include conditions for the automatic activation of the valet mode, as well as operating restrictions for the vehicle 102 when operating in the valet mode. The user configuration may be associated with a user device.

The computing platform 104 may receive the user configurations using various approaches. For instance, the computing platform 104 may be configured to interact with the vehicle user via the HMI controls 112 of the vehicle 102. Additionally or alternatively, the computing platform 104 may be configured to receive the user configuration from the mobile device 128 via the wireless connection 130. In this case, the user may interact with a user interface of the mobile device 128 to set up the automatic valet mode. Additionally or alternatively, the computing platform 104 may be configured to receive the user configuration from the server 178 via the TCU 170. The server 178 may be similarly provided with an interface allow for the adjustment of the user configuration. The user may access the server 178 via various approaches, such as using a computer and corresponding software (e.g. a web browser).

Figure 3B:
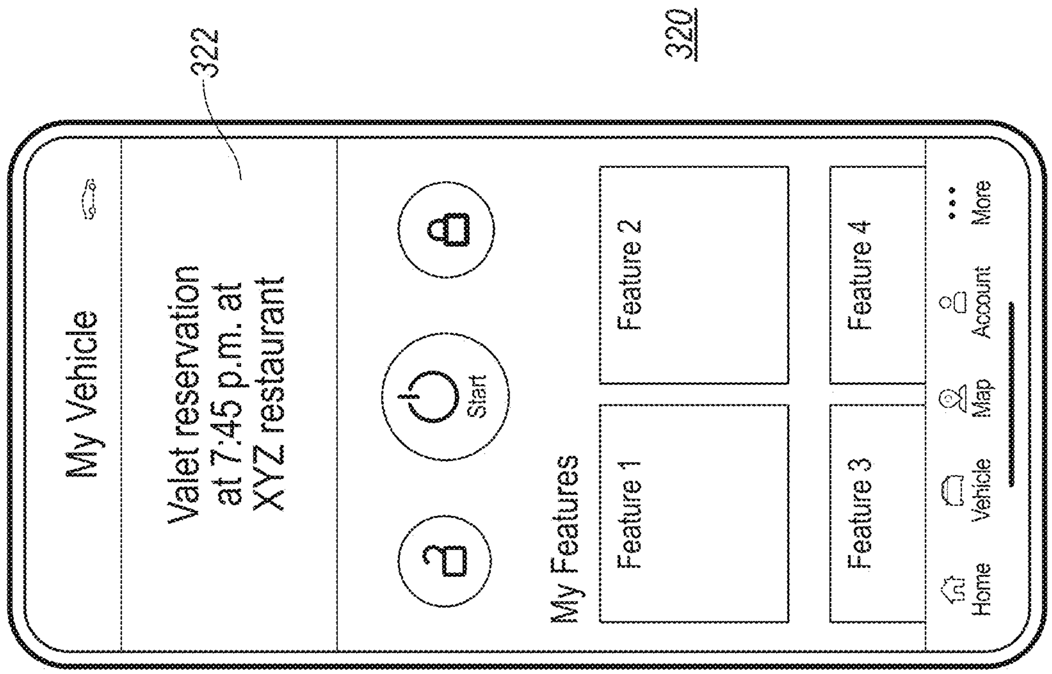
FIG. 3B illustrates an example user interface of another embodiment of the present disclosure.
Figure 3A:
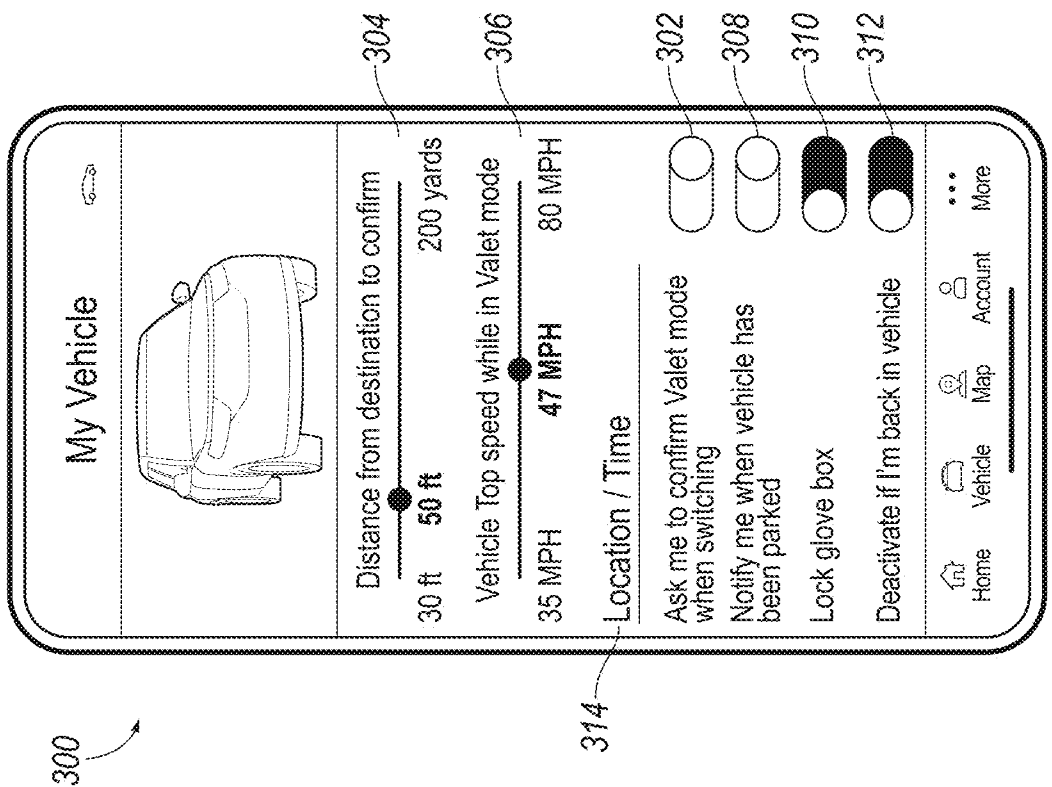
FIG. 3A illustrates an example user interface of one embodiment of the present disclosure.

Referring to FIG. 3A, an example valet mode configuration interface 300 is illustrated. With continuing reference to FIGS. 1 and 2, the interface 300 may be implemented via the display 114 of the computing platform 104 and/or the mobile device 128. The interface 300 may provide various options to update the user configuration. For instance, the interface 300 may provide the user with a confirmation option 302 configured to ask the user whether he/she prefers to receive a confirmation request before the vehicle automatically activates the valet mode. A toggle switch may be provided via the interface 300 to allow the user to switch between providing confirmation or not. In the present example the confirmation option is enabled.

The interface 300 may further provide the user with a confirmation distance option 304 indicative of how far from the valet location that the user prefers to receive the confirmation request if the confirmation option 302 is enabled. The confirmation distance option 304 may be presented in the form of a slider that allows the user to select the distance. Alternatively, the confirmation distance option 304 may be presented as an input box that allow the user to manually input the distance. In the present example, the confirmation distance is set to 50 feet.

The interface 300 may further provide the user with a speed limit option 306 indicative of a maximum speed that the vehicle 102 is allowed to operate during the valet mode. Similarly, the speed limit option 306 may be presented as a slider and set to 47 mph in the present example. Additionally or alternatively, the interface 300 may further provide the user with an speed change option (not shown) indicative of a maximum rate of speed change that the vehicle 102 is allowed to perform during the valet mode similar to the speed limit option 306.

The interface 300 may further provide the user with a parking notification option 308 indicative of a user preference to receive a notification once the vehicle 102 has been parked by the valet driver. In the present example a toggle switch corresponding to the parking notification option 308 is enabled.

The interface 300 may further provide the user with options to lock certain areas of the vehicle 102 including, but not limited to center console, front/rear exterior compartments, moonroof, sunroof, convertible top, and glovebox. As illustrated in FIG. 3A, the interface 300 may provide the user with a glovebox lock option 310 to either allow or prevent access to the glove box while the vehicle 102 is in the valet mode.

The interface 300 may further provide the user with deactivation option 312 indicative of one or more conditions for the vehicle 102 to automatically deactivate the valet mode and switch back to the normal mode. As illustrated in FIG. 3A, the deactivation option 312 may allow the vehicle to automatically deactivate the valet mode if the computing platform 104 detects the user has returned to or reentered to the vehicle 102. For instance, the computing platform 104 may automatically detect the return of the user using the mobile device 128 as a key.

The interface 300 may further provide the user with a location/time option 314 that, when selected, allows the user to configure location and time conditions that apply to the current automatic valet mode configuration. For instance, the user may specify the current automatic valet mode configuration only applies to a certain location and/or time, but not to other locations and/or times. For instance, the location/time option 314 may allow the user to specify an applicable location by inputting a zip code, address range or the like. In another example, the location/time option 314 may allow the user to specify the applicable time by inputting a start and end times defining an applicable time frame of the day.

Depending on different usage scenarios, the vehicle 102 may be associated with one or more automatic valet mode configurations applicable to different location and/or time conditions. For instance, the user may prefer a shorter confirmation distance specified by the confirmation distance option 304 in the city due to factors such as busy traffic conditions, and a longer confirmation distance at suburb. Additionally, the user may prefer to receive the notification when the vehicle is parked and lock certain storages (e.g. trunk) of the vehicle 102 in some geographic areas, but not to receive the notification or lock the certain storages in other geographic areas. Therefore, it may be preferable to allow the user to set up a plurality of automatic valet mode configurations to better apply to different location and/or time conditions. The interface 300 may provide the option by allowing the user to set up multiple valet configurations as well as select which of the configurations is active.

Returning to FIG. 2, responsive to receiving the automatic valet mode configuration, the process 200 may automatically apply the configuration to different scenarios such as appointments to different locations (e.g. restaurant appointments). At operation 204, the computing platform 104 receives a user appointment information. The appointment information may include entries such as time, location, availability of valet parking or the like. Similar to operation 202, the computing platform 104 may receive the appointment information by a user input via the HMI controls 112 and/or the mobile device 128. For instance, both the computing platform 104 and the mobile device 128 may be associated with one or more applications (e.g. food/restaurant applications) configured to schedule user appointments. The appointment information may be shared across different applications and used by the computing platform 104 to anticipate a valet mode activation. Additionally or alternatively, the computing platform 104 may receive the appointment information from the remote server 178. In this case, the appointment may be placed using a user account associated with the computing platform 104.

At operation 206, responsive to detecting valet parking is available at the appointment time and location, the computing platform 104 anticipates a valet mode activation and automatically schedules a valet event using the appointment information. Based on the appointment information and the user configuration, the valet event may specify entrance conditions that, when satisfied, automatically initiate the valet mode, what restrictions are to be applied during the valet mode, and exit conditions that, when satisfied, automatically deactivate the valet mode.

As discussed above, the vehicle 102 may be associated with a plurality of automatic valet mode configurations. The computing platform 104 may identify one of the automatic valet mode configurations that matches the conditions of the current appointment and apply the configuration to the current appointment accordingly. A reservation message may be output via a user interface of the computing platform 104 and/or the mobile device 128. Referring to FIG. 3B, an example interface 320 of one embodiment of the present disclosure is illustrated. Once the valet event is successfully scheduled, a pop-up message 322 may be displayed in the interface 320 to inform the user about the valet event. The pop-up message 322 may include information about the time and location of the valet event.

The computing platform 104 may be further configured to revise the valet event if the appointment has been changed. At operation 208, responsive to detecting the appointment has been updated (e.g. in terms of location and/or time), the process 200 proceeds to operation 210.

At operation 210, the computing platform 104 revises the valet event based on the appointment update information. For instance, responsive to receiving the updated location and/or time of the appointment, the computing platform 104 may revised the location and/or time of the valet event accordingly. The computing platform 104 may further revise the option settings (as illustrated with reference to FIG. 3A) of the valet event based on the new location and/or time.

At operation 212, after operation 208 or 210, and responsive to detecting the valet event conditions has been met, the computing platform 104 optionally outputs a confirmation request to confirm whether to activate the automatic valet mode. For instance, the valet event may be associated with various conditions such as time, location, and the confirmation distance from the valet destination. Responsive to the vehicle 102 having arrived within the confirmation distance, a message may be presented via the display 114 of the computing platform 104 and the user may be provided with options on how to proceed.

The computing platform 104 may provide the user with an option to cancel the valet event. If the user chooses the cancel, the process 200 proceeds from operation 214 to operation 216 and the computing platform 104 cancels the current valet event.

The computing platform 104 may further provide the user with a confirmation option. Responsive to detecting user confirming the valet event, the process proceeds to operation 218 and the computing platform 104 automatically activates the valet mode. Significantly, the valet mode is activated automatically, without requiring the user to perform additional interactions (e.g. the valet mode may engage without the user having to input a PIN). The computing platform 104 may automatically authenticate the user via the mobile device 128 as the key and/or via facial images of the user captured via the camera 117.

The computing platform 104 may further provide the user with one or more delay options corresponding to different time delays (e.g. 1 minute, 3 minute, or the like). If the user prefers to not to activate the valet mode now but reserves the option to activate at a later time, the user may choose the corresponding delay time via the HMI controls 112. If so, the process 200 proceeds to operation 220 and a timer corresponding to the selected time of delay may be set. Once the timer expires, the process 200 proceeds from operation 220 to operation 218.

At operation 222, the computing platform 104 may determine whether to deactivate the valet mode responsive to certain predefined conditions being met. For instance, the computing platform 104 may automatically deactivate the valet mode responsive to detecting the user has been back in the vehicle 102 suggesting the valet driver has returned the vehicle 102 to the user. The presence of the user may be detected in various manners. For instance, the computing platform 104 may detect a reconnection with the mobile device 128 associated with the user. Additionally or alternatively, the computing platform 104 may detect and identify the user via facial recognition using images captured via the camera 117. Responsive to detecting the deactivation conditions have been met, the process 200 proceeds to operation 224. Otherwise, control remains at operation 222 to continue operation in the valet mode.

At operation 224, the computing platform 104 automatically deactivates the valet mode. This deactivation may also be performed automatically, without requiring user interactions such as PIN authentication.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:

a controller programmed to, responsive to receiving information for an appointment including an appointment time and an appointment location, schedule a valet event using the information in anticipation for a valet mode associated with the appointment, wherein the valet event includes one or more conditions having a valet destination and a confirmation distance from the valet destination, set up a first valet configuration applicable to a first time and a first location;

set up a second valet configuration applicable to a second time and a second location, wherein the second valet configuration is different from the first valet configuration;

responsive to the appointment time and the appointment location matching the first time and the first location, apply the first valet configuration to schedule the valet event; and responsive to the vehicle being within the confirmation distance from the valet destination, output a confirmation request to confirm activation of the valet mode; and responsive receiving a user confirmation, activate the valet mode to restrict at least one vehicle function.

2. The vehicle of claim 1, wherein the controller is further programmed to:

responsive to receiving user input indicative of a time delay for entering the valet mode, defer entering the valet mode until expiration of a timer corresponding to the time delay.

3. The vehicle of claim 1, wherein the controller is further programmed to:

responsive to identifying an authorized user entering the vehicle in the valet mode, deactivate the valet mode.

4. The vehicle of claim 3, further comprising a wireless transceiver configured to communicate with a mobile device of a authorized user, wherein the controller is further programmed to:

identify the authorized user by establishing a wireless connection between the wireless transceiver and the mobile device.

5. The vehicle of claim 3, further comprising a camera configured to capture an image of a authorized user, wherein the controller is further programmed to:

identify the authorized user by analyzing the image using facial recognition.

6. A method for a vehicle, comprising:

responsive to receiving information for an appointment including an appointment time and appointment location, matching the appointment with one of a plurality of preset valet configurations to identify a matching configuration that is associated with a first time and a first location;

matching the appointment with the matching configuration by determining the appointment time matches the first time and the appointment location matches the first location;

schedule a valet event using the matching configuration, wherein the valet event includes one or more conditions that when met cause the vehicle to automatically transition into a valet mode in which at least one vehicle function is restricted; and responsive to the one or more conditions being met, automatically activate the valet mode.

7. The method of claim 6, further comprising:

responsive to receiving an update for the appointment, revising the one or more conditions of the valet event based on the update.

8. The method of claim 6, wherein the one or more conditions include a valet destination, the method further comprising:

responsive to detecting the vehicle being within a predefined distance from the valet destination, outputting a confirmation request to confirm activation of the valet mode.

9. The method of claim 6, further comprising:

responsive to identifying an authorized user entering the vehicle in the valet mode, deactivate the valet mode.

10. The method of claim 9, further comprising:

identifying the authorized user by establishing a wireless connection with a mobile device associated with the authorized user.

11. The method of claim 9, further comprising:

identifying the authorized user by analyzing an image captured using a camera and analyzing the image using facial recognition.

12. A non-transitory computer-readable medium, comprising instructions, when executed by a vehicle, make the vehicle to:

responsive to receiving information for an appointment including an appointment time and an appointment location, schedule a special vehicle mode event using the information in anticipation for a special vehicle mode associated with the appointment, and set up a first special vehicle mode configuration applicable to a first time and a first location;

set up a second special vehicle mode configuration applicable to a second time and a second location, wherein the second special vehicle mode configuration is different from the first special vehicle mode configuration; and responsive to the appointment time and the appointment location matching the first time and the first location, activate the special vehicle mode to restrict at least one vehicle function using the first special vehicle mode configuration.

13. The non-transitory computer-readable medium of claim 12, further comprising instructions, when executed by a vehicle, make the vehicle to:

responsive to the vehicle arriving at the first location, output a confirmation request to confirm activation of the special vehicle mode.

14. The non-transitory computer-readable medium of claim 12, further comprising instructions, when executed by a vehicle, make the vehicle to:

responsive to identifying an authorized user entering the vehicle in the special vehicle mode, deactivate the special vehicle mode.

15. The non-transitory computer-readable medium of claim 14, further comprising instructions, when executed by a vehicle, make the vehicle to:

identify the authorized user by establishing a wireless connection between the vehicle and a mobile device associated with the authorized user in the special vehicle mode.

16. The vehicle of claim 1, wherein the first valet configuration is associated with a first confirmation distance from the first location, the second valet configuration is associated with a second confirmation distance from the second location, and the second confirmation distance is different from the first confirmation distance.

* * * * *